US008469264B1

(12) United States Patent
Almeida

(10) Patent No.: US 8,469,264 B1
(45) Date of Patent: Jun. 25, 2013

(54) PROTECTIVE COVER FOR AUTOMATED TELLER MACHINE

(76) Inventor: Michael Almeida, Freehold, NJ (US)

( * ) Notice: Subject to any disclaimer, the term of this patent is extended or adjusted under 35 U.S.C. 154(b) by 0 days.

(21) Appl. No.: 13/396,743

(22) Filed: Feb. 15, 2012

(51) Int. Cl.
*G06Q 40/00* (2012.01)

(52) U.S. Cl.
USPC .......... 235/379

(58) Field of Classification Search
USPC .......... 235/379
See application file for complete search history.

(56) References Cited

U.S. PATENT DOCUMENTS

| | | | | | |
|---|---|---|---|---|---|
| 4,449,763 | A | * | 5/1984 | Barnett | 312/208.3 |
| 5,021,638 | A | * | 6/1991 | Nopper et al. | 235/145 R |
| 5,096,317 | A | * | 3/1992 | Phillippe | 400/714 |
| D349,893 | S | * | 8/1994 | Bennett | D14/440 |
| 5,934,813 | A | * | 8/1999 | Nyako et al. | 400/714 |
| 6,149,001 | A | * | 11/2000 | Akins | 206/320 |
| 6,572,012 | B1 | * | 6/2003 | Gannon et al. | 235/379 |
| 6,705,787 | B2 | * | 3/2004 | Jeffries et al. | 400/714 |
| 6,955,293 | B1 | * | 10/2005 | Katsanevas | 235/379 |
| 7,187,540 | B2 | * | 3/2007 | Homer et al. | 361/679.21 |
| 7,357,307 | B1 | * | 4/2008 | Block et al. | 235/379 |
| 2004/0066613 | A1 | * | 4/2004 | Leitao | 361/683 |

* cited by examiner

*Primary Examiner* — Daniel Hess
(74) *Attorney, Agent, or Firm* — Stuart M. Goldstein

(57) ABSTRACT

A cover for protecting the front face of ATMs consists of a single, continuous transparent sheet of flexible material designed to overlay the front face of an ATM. The cover's sheet is made up of sections which correspond to the display screen, keypad, receipt printer, ATM card reader, and other features and operating components of the ATM. The cover is secured to the front surface of the ATM by adhesive, or equivalent means, to provide a permanent attachment to the ATM.

7 Claims, 2 Drawing Sheets

PROTECTIVE COVER FOR AUTOMATED TELLER MACHINE

BACKGROUND OF THE INVENTION

Automated teller machines (ATMs) have become a necessary tool in the day-to-day financial life of most individuals. ATMs are currently utilized for a variety of different transactions, including making fund deposits, withdrawing money, checking account balances, etc. ATMs are conveniently located in many varied locations and, of course, some of these locations are outdoors or otherwise in areas unprotected from the weather. While there are sometimes overhanging roofs, wind and rain barriers, or other semi-shelters designed to protect the outdoor ATM user, there is currently no means to adequately protect the front face of the ATM, especially its operating and other exposed components, from inclement weather. As many of these ATMs components comprise critical electronics which are integral to the machine's operation, when ambient moisture, in the form of rain, dew, sleet, and snow, falls on the components, they are likely to sustain damage, rendering the machine inoperable. There is thus a need to provide an effective, economical, and easily installable product which will protect the front face and the operating components of ATMs from the effects of weather, regardless of the configuration of the machine.

SUMMARY OF THE INVENTION

It is thus the object of the present invention to address the problem of ATMs which are exposed to weather conditions, particularly moisture from ambient precipitation, in order to maintain the operational integrity of such machines.

This object is accomplished by the present invention, a cover for protecting the front face of ATMs and, particularly, the operating components of these machines. The cover consists of a single, continuous transparent sheet of flexible material designed to overlay the front face of an ATM. The cover's sheet is made up of sections which correspond to the display screen, keypad, receipt printer. ATM card reader, cash dispensing slot, cash deposit slot, and other features and operating components of the ATM. The cover is secured to the front surface of the ATM by adhesive, or equivalent means, to provide a permanent attachment to the ATM.

Molded plastic covers for computer keyboards and similar devices, as exemplified by the cover disclosed in U.S. Pat. No. 6,705,787, are available. However, such covers are designed to be readily removable and, most significantly, are not contemplated for use with and are not designed for ATMs. As a result they are not waterproof nor do they weatherproof that which they are protecting. The present invention, on the other hand, is specifically designed to be permanently secured to the front face of an ATM in order to protect its operating components from inclement weather by waterproofing this area of the ATM, thus preserving the operating components from damage and ensuring the overall integrity of the ATM itself.

The novel features which are considered as characteristic of the invention are set forth in particular in the appended claims. The invention, itself, however, both as to its design, construction and use, together with additional features and advantages thereof, are best understood upon review of the following detailed description with reference to the accompanying drawings.

DETAILED DESCRIPTION OF THE INVENTION

Figure 1:
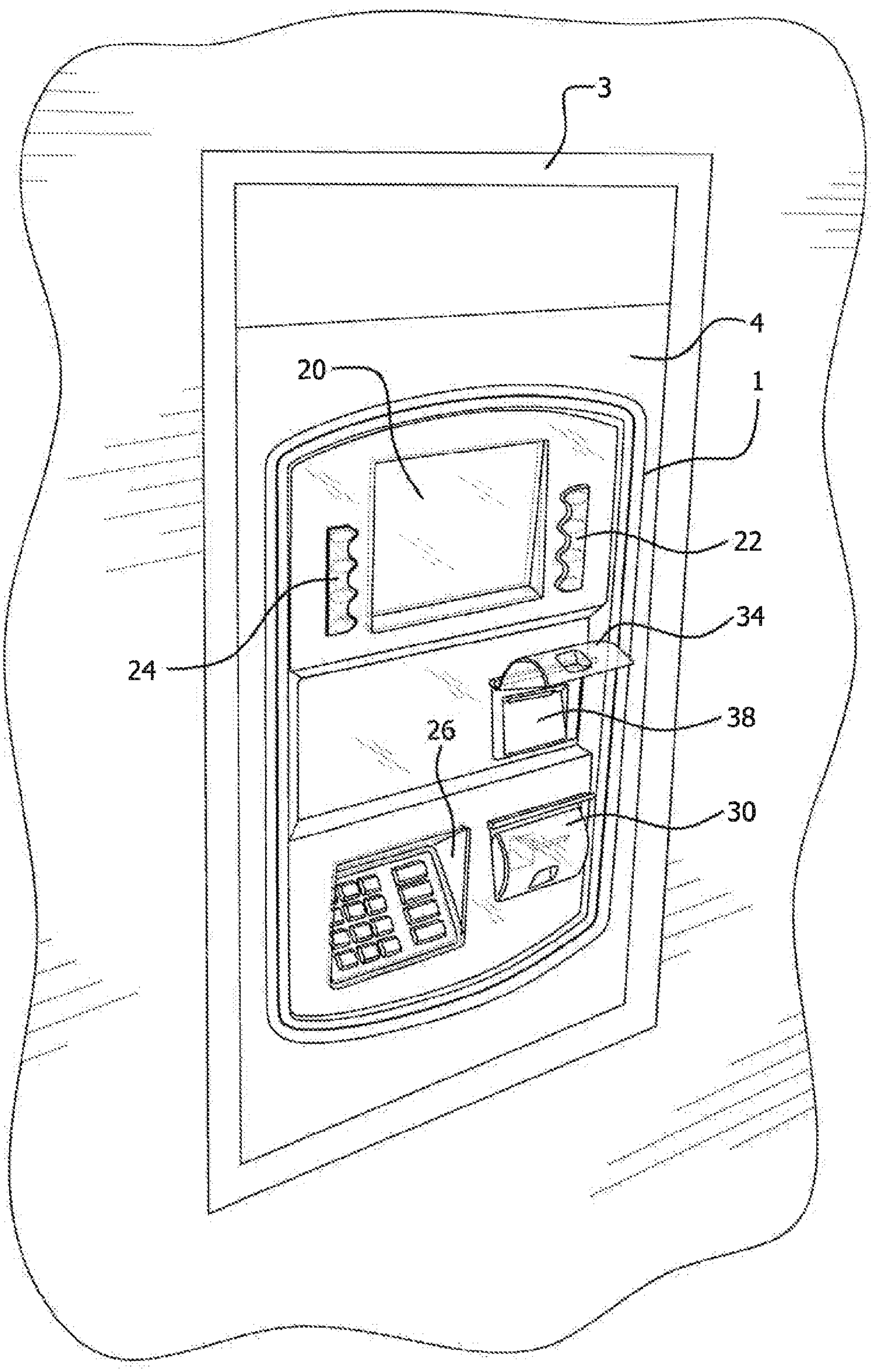
FIG. 1 shows the protective cover of the present invention in place on the front face of an ATM machine.
Figure 2:
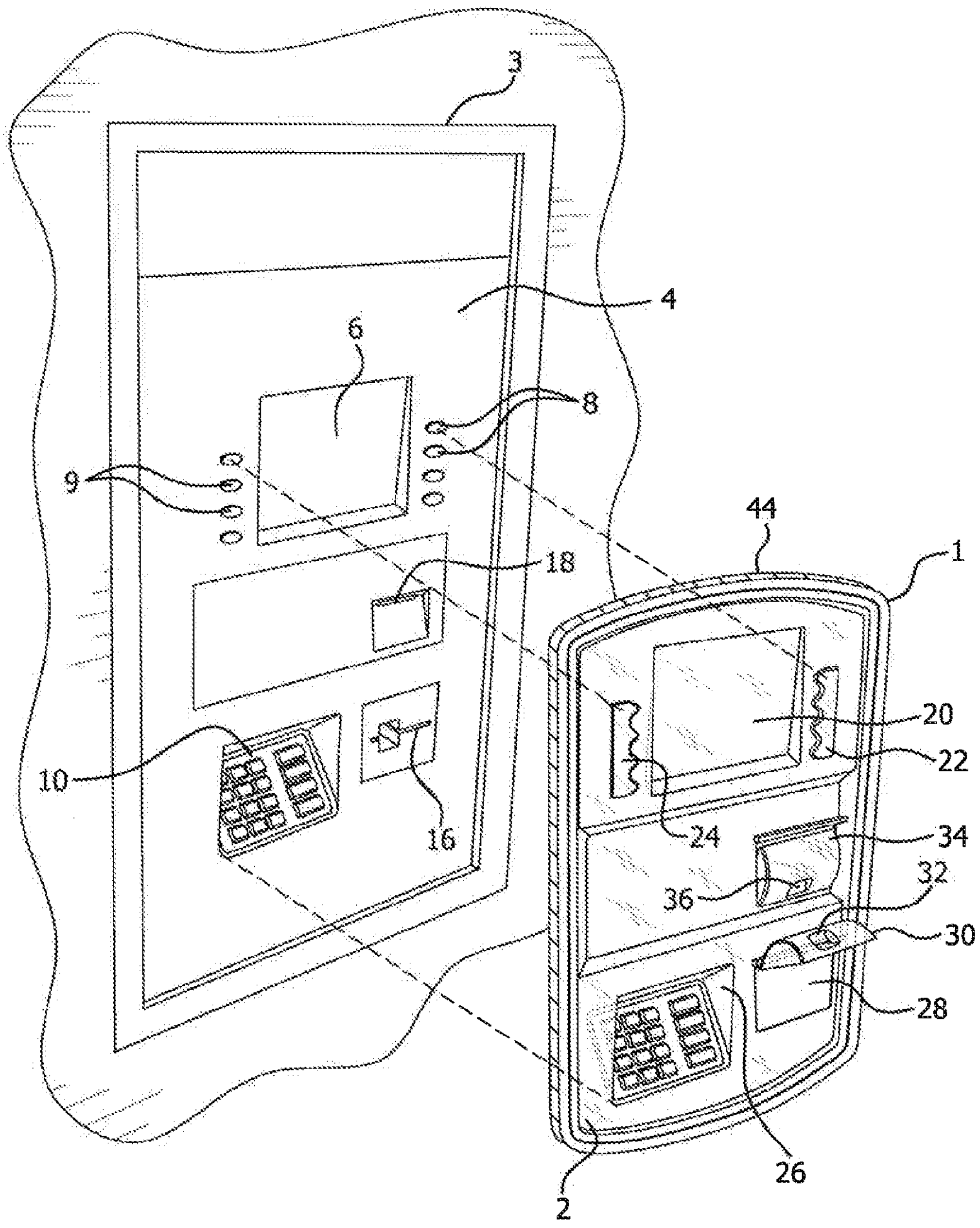
FIG. 2 shows the protective cover of the present invention in line for placement on the front face of an ATM.

ATM cover 1 of the present invention is designed to protect and weatherproof the operating components positioned on front face 4 of ATM 3. FIGS. 1 and 2 show a front face 4 of a typical ATM having operating components such as display screen 6, screen buttons 8 and 9, keypad 10, ATM or credit card reader 16, and receipt printer 18.

Cover 1, having front surface 2, is formed as a single, continuous, transparent sheet of flexible material. It is contemplated that a lightweight, flexible plastic or equivalent material will be used. Cover 1 is designed to overlay front face 4 of ATM 3. The cover can be economically molded in one piece, shaped and adapted to be used with any ATM configuration.

Cover 1 comprises screen protection section 20 corresponding to the configuration and size of display screen 6, screen button protection sections 22 and 24 corresponding to the configuration and size of screen buttons 8 and 9, and keypad protection section 26 corresponding to the configuration and size of keypad 10. Screen protection section 20 is slightly inset in relation to front surface 2 of cover 1. Keypad protection section 26 is inset downwardly in relation to front surface 2 of cover 1.

Open port 28 extends through cover 1 and is shaped so as to surround card reader 16 located within front face 4, when the cover is placed over front face 4. Port cover door 30 is pivotably attached to front surface 2 of cover 1 and is rotatably moveable between a down, first position, in which credit card reader 16 is fully enclosed within port cover door 30, see FIG. 1, to an open, second position which allows access to the credit card reader, see FIG. 2, when the cover is placed over front face 4. Indentation 32 within port cover door 30 allows the port cover door to be easily opened and closed.

Open port 38 extends through cover 1 and is shaped so as to surround receipt printer 18 within front face 4, when the cover is placed over front face 4. Port cover door 34 is pivotably attached to front surface 2 of cover 1 and is rotatably moveable between a down, closed first position, in which receipt printer 18 is fully enclosed within port cover door 34, see FIG. 2, to an open, second position which allows access to the receipt printer, see FIG. 1, when the cover is placed over front face 4. Indentation 36 within port cover door 34 allows the port cover door to be easily opened and closed.

Port cover doors 30 and 32 are slightly curved outward in order to provide better visibility to the user of the internal areas enclosed by the cover door, as well as providing weatherproof protection to the paper receipts being expelled from receipt printer 18 and for the ATM cards being inserted and expelled from card reader 16.

A layer of adhesive material, double backed tape 44 or equivalent attachment means circumscribes the back of cover 1. Once cover 1 is properly aligned over front face 4 of ATM 3 such that the various protective sections of the cover are positioned over their respective operating components, as shown in FIG. 2, the cover is pressed onto the front face of the ATM. Adhesive 44 then provides the permanent attachment means by which cover 1 is secured onto front surface 4 of ATM 3.

It is contemplated that protective cover 1 will be secured such that it is immoveable and permanently positioned and secured onto front face 4. By the use of the word "permanent," it is contemplated that it will not be possible to remove cover 1 during ordinary usage of ATM 3. Removal of cover 1 will only be necessary when the cover becomes worn, weathered, obscured or otherwise unusable. This can be accomplished only by dissolving or otherwise breaking down adhesive 44 with appropriate dissolution compositions or by utilizing cutting devices, tools, or equivalent separation means. Cover 1, secured by adhesive 44 to front face 4 of ATM 3, can not be removed by simple manual detachment, without the aid of such separation means.

The cover of the present invention thus provides an economically manufactured lightweight product which, once easily installed, protects the operating components of ATMs, by providing an enclosure which effectively waterproofs the front surface of ATMs.

Certain novel features and components of this invention are disclosed in detail in order to make the invention clear in at least one form thereof. However, it is to be clearly understood that the invention as disclosed is not necessarily limited to the exact form and details as disclosed, since it is apparent that various modifications and changes may be made without departing from the spirit of the invention. More specifically, it is contemplated that protective cover 1, molded as a single piece, can be custom designed to fit over the front face of any ATM. The scope of the invention is thus not to be considered restricted to the configuration of the cover as described herein.

The invention claimed is:

1. A cover for protecting the front face of an ATM comprising a keypad, a display screen, a receipt printer, an ATM card reader, a cash dispenser slot, and a cash deposit slot, said cover comprising:

a single, continuous, transparent sheet of flexible material configured to overlay the front face of an ATM, said sheet comprising:

a screen protection section configured to overlay the display screen;

a keypad protection section configured to overlay the keypad;

an open port configured to surround the receipt printer and a port cover means pivotably attached to the sheet for rotatable movement between a first position wherein the receipt printer is fully enclosed within the port cover means to a second position which permits access to the receipt printer;

a second open port configured to surround the card reader and second port cover means pivotably attached to the sheet for rotatable movement between a first position wherein the card reader is fully enclosed within the second port cover means to a second position which permits access to the card reader; and attachment means circumscribing the sheet for securing the cover to the front face of the ATM, said attachment means providing an immoveable, permanent connection to the front face of the ATM.

2. The cover for protecting the front face of an ATM as in claim 1 wherein the ATM comprises screen buttons, said cover further comprising at least one screen button protection section configured to overlay the screen buttons.

3. The cover for protecting the front face of an ATM as in claim 1 wherein the cover has a front surface and the keypad protection section is inset downward in relation to the front surface.

4. The cover for protecting the front face of an ATM as in claim 1 wherein the cover has a front surface and the screen protection section is insert in relation to the front surface.

5. The cover for protecting the front face of an ATM machine as in claim 1 wherein the first and second port cover means comprise doors having outwardly curved surfaces.

6. The cover for protecting the front face of an ATM as in claim 1 wherein the cover is permanently connected to the front face of the ATM, such that the cover can not be removed from the front face without the use of independent tools or separation devices.

7. The cover for protecting the front face of an ATM as in claim 1 wherein the cover is permanently connected to the front face of the ATM, such that the cover can not be removed from the front face without the use of independent separation components.

* * * * *